(12) United States Patent
Nakano

(10) Patent No.: US 10,920,725 B2
(45) Date of Patent: Feb. 16, 2021

(54) FLUID PASSAGE DEVICE AND METHOD OF MANUFACTURING THE SAME

(71) Applicant: DENSO CORPORATION, Kariya (JP)

(72) Inventor: Masashi Nakano, Kariya (JP)

(73) Assignee: DENSO CORPORATION, Kariya (JP)

(*) Notice: Subject to any disclaimer, the term of this patent is extended or adjusted under 35 U.S.C. 154(b) by 484 days.

(21) Appl. No.: 15/867,984

(22) Filed: Jan. 11, 2018

(65) Prior Publication Data

US 2018/0283337 A1 Oct. 4, 2018

(30) Foreign Application Priority Data

Mar. 30, 2017 (JP) .................................. 2017-67937

(51) Int. Cl.
| | |
|---|---|
| F16L 43/00 | (2006.01) |
| F02M 59/44 | (2006.01) |
| F02M 63/00 | (2006.01) |
| B24C 1/10 | (2006.01) |
| B23B 35/00 | (2006.01) |

(52) U.S. Cl.
CPC .............. F02M 59/44 (2013.01); B24C 1/10 (2013.01); F16L 43/001 (2013.01); B23B 35/00 (2013.01); B23B 2215/24 (2013.01); B23B 2215/72 (2013.01); B23B 2220/445 (2013.01); B23B 2222/00 (2013.01); F02M 63/007 (2013.01); F02M 63/0078 (2013.01); F02M 2200/80 (2013.01); F02M 2200/85 (2013.01)

(58) Field of Classification Search
CPC ......... F16L 43/001; F16L 41/02; F16L 43/00; F02M 59/44; F02M 63/007; F02M 63/0078; F02M 2200/80; F02M 2200/85

USPC ................................. 285/179, 179.1, 133.11
See application file for complete search history.

(56) References Cited

U.S. PATENT DOCUMENTS

| | | | |
|---|---|---|---|
| 1,803,578 A * | 5/1931 | Weatherhead, Jr. ..... | 285/133.11 |
| 6,929,288 B2 | 8/2005 | Usui | |
| 7,607,458 B2 * | 10/2009 | Arnold .................... | F16L 41/02 |
| 2003/0024739 A1 | 2/2003 | Runquist et al. | |
| 2005/0252691 A1 | 11/2005 | Bramlett et al. | |
| 2008/0217911 A1 * | 9/2008 | Irimies ......................... | 285/179 |

(Continued)

FOREIGN PATENT DOCUMENTS

| | | |
|---|---|---|
| CN | 101363307 A1 | 2/2009 |
| JP | 2000-343429 | 12/2000 |

(Continued)

Primary Examiner — Matthew Troutman
Assistant Examiner — William S. Choi
(74) Attorney, Agent, or Firm — Nixon & Vanderhye P.C.

(57) ABSTRACT

A fluid passage device including a passage for flowing high-pressure fluid of a predetermined or higher pressure comprises a sac bore cylinder of a metal, which includes therein a closed passage and a branch passage. The closed passage is shaped to extend straightly in a predetermined direction and has a closed top end, and the branch passage is branched off from the closed passage. A top end part of the closed passage at a closed side is defined by a ceiling wall surface, which is perpendicular to the predetermined direction, a passage wall surface, which is parallel to the predetermined direction, and a connecting wall surface, which connects the ceiling wall surface and the passage wall surface. The connecting wall surface is shaped to curve in a direction to expand the closed passage.

2 Claims, 10 Drawing Sheets

(56) References Cited

U.S. PATENT DOCUMENTS

2009/0120411 A1   5/2009  Arnold et al.
2010/0281938 A1  11/2010  Tange et al.

FOREIGN PATENT DOCUMENTS

| | | |
|---|---|---|
| JP | 2001-200773 | 7/2001 |
| JP | 2010-064194 | 3/2010 |

\* cited by examiner

| No. | R | H | Da | D | Ha | REFLECTION | | | TOTAL (1+2) | TOTAL (0 to 2) | PROBABILITY (%) |
|---|---|---|---|---|---|---|---|---|---|---|---|
| | | | | | | 0 | 1 | 2 | | | |
| 1 | 0.5 | 3.2 | 10 | 1 | 0 | 0 | 9 | 3 | 12 | 12 | 12 |
| 2 | 3.2 | 3.2 | 10 | 2.1 | 0 | 3 | 9 | 2 | 11 | 14 | 14 |
| 3 | 3.2 | 3.2 | 6.42 | 2.1 | 3 | 26 | 11 | 4 | 15 | 41 | 41 |
| 4 | 0.5 | 0 | 6.42 | 1 | 0 | 0 | 11 | 0 | 11 | 11 | 11 |
| 5 | 0.5 | 3.2 | 10 | 2.1 | 3 | 18 | 6 | 8 | 14 | 32 | 32 |
| 6 | 0.5 | 3.2 | 6.42 | 2.1 | 0 | 12 | 7 | 10 | 17 | 29 | 29 |
| 7 | 3.2 | 3.2 | 10 | 1 | 3 | 14 | 5 | 8 | 13 | 27 | 27 |
| 8 | 0.5 | 3.2 | 6.42 | 1 | 3 | 2 | 6 | 11 | 17 | 19 | 19 |
| 9 | 3.2 | 0 | 10 | 1 | 0 | 0 | 0 | 0 | 0 | 0 | 0 |
| 10 | 3.2 | 0 | 10 | 2.1 | 3 | 19 | 6 | 0 | 6 | 25 | 25 |
| 11 | 0.5 | 0 | 6.42 | 2.1 | 3 | 29 | 2 | 9 | 11 | 40 | 40 |
| 12 | 3.2 | 3.2 | 6.42 | 1 | 0 | 3 | 24 | 4 | 28 | 31 | 31 |
| 13 | 3.2 | 0 | 6.42 | 1 | 3 | 24 | 4 | 0 | 4 | 28 | 28 |
| 14 | 0.5 | 0 | 10 | 2.1 | 0 | 0 | 14 | 0 | 14 | 14 | 14 |
| 15 | 0.5 | 0 | 10 | 1 | 3 | 13 | 4 | 1 | 5 | 18 | 18 |
| 16 | 3.2 | 0 | 6.42 | 1.5 | 0 | 4 | 14 | 0 | 14 | 18 | 18 |
| 17 | 2 | 0 | 8 | 2.1 | 0 | 5 | 14 | 0 | 14 | 19 | 19 |
| 18 | 2 | 1.2 | 6.42 | 1 | 3 | 31 | 9 | 13 | 22 | 53 | 53 |
| 19 | 3.2 | 1.2 | 6.42 | 2.1 | 1.5 | 31 | 26 | 0 | 26 | 57 | 57 |
| 20 | 0.5 | 1.2 | 8 | 1.5 | 0 | 3 | 19 | 1 | 20 | 23 | 23 |
| 21 | 2 | 0 | 10 | 1.5 | 1.5 | 6 | 9 | 0 | 9 | 15 | 15 |
| 22 | 3.2 | 3.2 | 8 | 1 | 1.5 | 11 | 9 | 6 | 15 | 26 | 26 |
| 23 | 0.5 | 0.5 | 6.42 | 1 | 0 | 3 | 15 | 0 | 15 | 18 | 18 |

FLUID PASSAGE DEVICE AND METHOD OF MANUFACTURING THE SAME

CROSS REFERENCE TO RELATED APPLICATION

The present application is based on Japanese patent application No. 2017-67937 filed on Mar. 30, 2017, the whole contents of which are incorporated herein by reference.

FIELD

The present disclosure relates to a fluid passage device, which has a passage for flowing fluid, and a method of manufacturing the same.

BACKGROUND

As a fluid passage device having a main passage for flowing fluid and a body, in which a branch passage branched from the main passage is formed in its metal material, a common rail, a fuel pump, a fuel injection valve and the like, which are used for an internal combustion engine, are used. In the fluid passage device of this kind, since high pressure is exerted on a passage wall, stress concentrates on a corner part, at which the main passage and the branch passage cross. It is therefore likely that a crossing part is damaged, for example, the corner part is chipped. To counter this potential problem, patent document JP 2001-200773A proposes to perform shot peening by causing shot materials to collide the crossing part after boring bores in the main passage and the branch passage thereby to remove tensile stress and apply residual compressive stress to the crossing part.

Specifically, after boring a through bore as the main passage, an injection nozzle is inserted from one of open ends of the through bore and a reflection member is inserted separately from the other open end of the through bore. The injection nozzle is for injecting the shot materials in a through bore direction. At a top end of the reflection material, a reflection surface is formed for bouncing back the shot materials, which are injected from the injection nozzle, in a perpendicular direction. By positioning the reflection member at a position so that the reflection surface faces the crossing part, the shot materials are caused to collide the crossing part to thereby apply the residual compressive stress.

Even in case that a top end of the main passage required for the fluid passage device is in a closed-shape, it is a general practice to form the through bore by boring first to allow insertion of the reflection member and close the other open end of the through bore after the shot peening.

According to the conventional manufacturing method described above, however, the reflection material need be replaced frequently because the reflection surface is worn away shortly. For mass production of the fluid passage device, productivity of the conventional manufacturing method is low because of frequent replacements of worn-out members such as reflection material.

The inventor studied a manufacturing method, which does not need a reflection material by using an injection nozzle capable of injection in a direction perpendicular to a direction of a through bore. The injection nozzle of this type is structured to have a reflection surface, which changes the injection by reflecting shot materials injected in the direction of the through bore. Although this structure does not need the reflection material, the wear of the reflection surface provided in the injection nozzle is not avoided in the end. Since the injection nozzle need be replaced as the wear progresses, it is not sufficient to counter low productivity.

SUMMARY

The present disclosure addresses the problem described above and has an object to provide a fluid passage device and a method of manufacturing the same, which reduce replacement of a worn-out part.

According to one aspect, a fluid passage device including a passage for flowing fluid comprises a metal body including therein a closed passage, which is shaped to extend straightly in a predetermined direction and has a closed top end, and a branch passage, which is branched off from the closed passage. A top end part of the closed passage at a closed side is defined by a ceiling wall surface, which is perpendicular to the predetermined direction, a passage wall surface, which is parallel to the predetermined direction, and a connecting wall surface, which connects the ceiling wall surface and the passage wall surface. The connecting wall surface is shaped to curve in a direction to expand the closed passage.

According to the fluid passage device described above, the connecting wall surface, which connects the ceiling wall surface and the passage wall surface of the top end wall surface forming the top end part of the closed side of the closed passage, is curved in the direction to expand the closed passage. With this configuration, a residual compressive stress is applied by injecting shot materials to collide a crossing part, at which the wall surface of the closed passage and the wall surface of the branch passage cross, that is, the crossing part (corner part) between the closed passage and the branch passage, which is likely to be damaged by stress concentration, in the following manner. That is, by inserting an injection nozzle from the opening of the closed passage and injecting the shot materials from the injection nozzle in the predetermined direction, the injected shot materials not only collide the crossing part after reflecting on the ceiling wall surface but also collide the crossing part after reflecting on the connecting wall surface. As a result, since the body is formed to have the function of reflection, which was conventionally attained by a reflection member, the conventional reflection member need not be provided and worn-out members need not be replaced frequently.

In the other aspect, a method of manufacturing a fluid passage device comprises a boring step, a shot preparation step and a shot step. The boring step forms a closed passage by boring a bore in a body at a part, which corresponds to the closed passage, without penetration. The shot preparation step inserts into the closed passage an injection nozzle, which has an injection opening for injecting shot materials, after the boring step. The shot step injects the shot materials from the injection opening in a direction of insertion after the shot preparation step. The shot preparation step locates the injection opening at a position nearer than a branch passage in the direction of insertion, and the shot step injects the shot materials to collide a crossing part, at which a wall surface of the closed passage and a wall surface of the branch passage cross, after being reflected at a top end wall surface, which forms a top end part of a closed side of the closed passage.

According to the other aspect, for the collision of the shot materials against the crossing part, at which the wall surface of the closed passage and the wall surface of the branch passage cross, that is, the corner part, which is likely to be damaged by stress concentration, the shot materials are injected to reflect on the top end wall surface of the body before the collision. As a result, since the body is formed to have the function of reflection, which is conventionally attained by a separate reflection member, the conventional reflection member need not be provided and worn-out members need not be replaced frequently.

BRIEF DESCRIPTION OF THE DRAWINGS

FIG. 8 is an illustration showing a simulation result of a relation between a probability of collision of the shot material with a crossing part;

DETAILED DESCRIPTION OF THE EMBODIMENT

Figure 1:
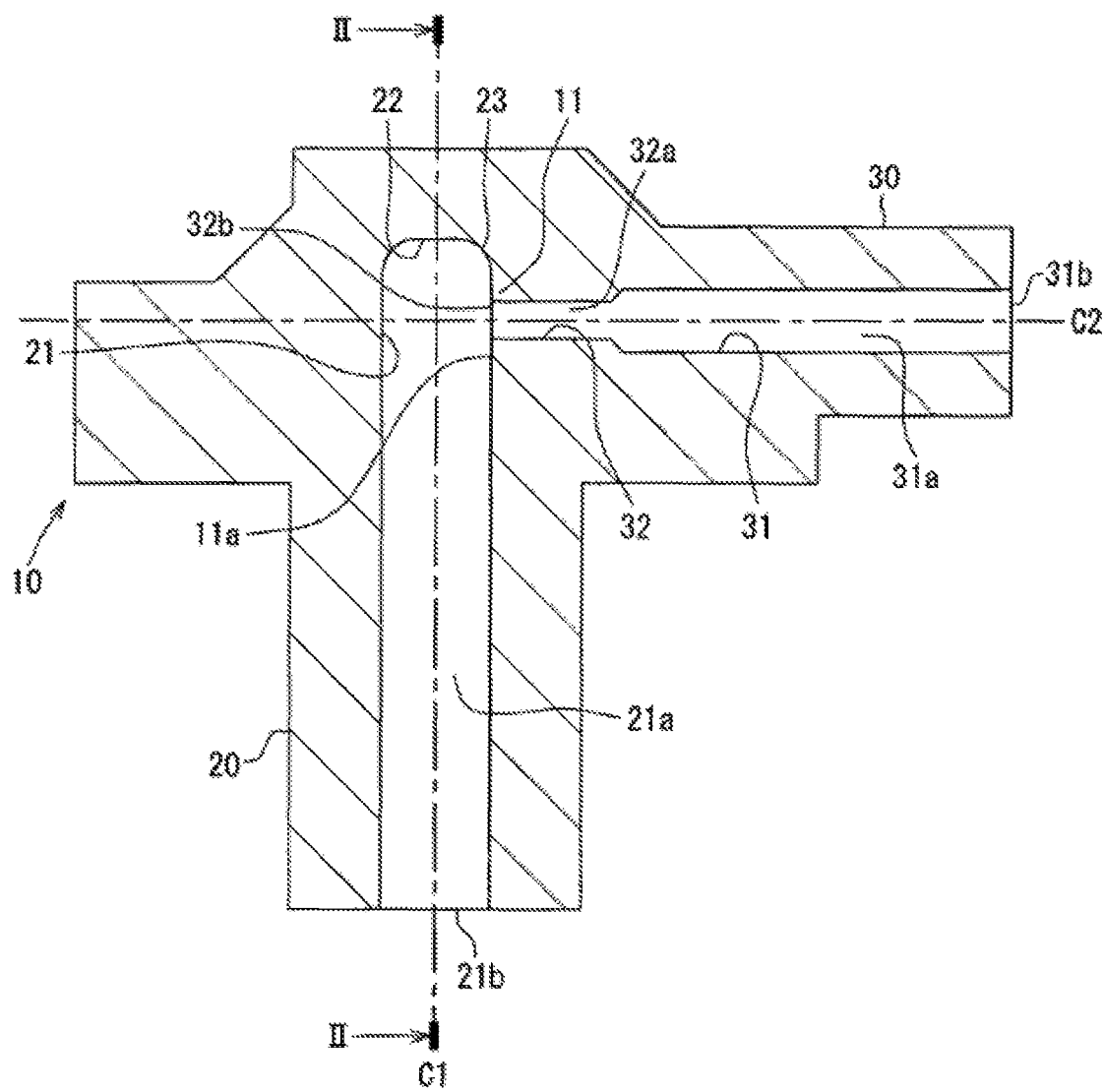
FIG. 1 is a sectional view showing a fluid passage device according to a first embodiment.

A fluid passage device and a manufacturing method for the same will be described below with reference to multiple embodiments shown in the drawings. In each embodiment, same structure and method described in preceding embodiments will be designated with the same reference symbols for simplification of the description.

First Embodiment

A fluid passage device according to the first embodiment is applied to a high-pressure fuel pump mounted in a vehicle. The high-pressure fuel pump pressurizes fuel to a predetermined pressure or higher pressure and supplies the high-pressure fuel (fluid) to a common rail. The common rail accumulates the high-pressure fuel supplied from the high-pressure fuel pump and distributes the high-pressure fuel to a multiple number of fuel injection valves. The fuel injection valve injects the distributed high-pressure fuel into a combustion chamber of an internal combustion engine. The high-pressure fuel pump has a sac bore cylinder 10 shown in FIG. 1 and a piston, which is not shown, to pressurize low-pressure fuel flowing into the sac bore cylinder 10 by the piston and feeds the pressurized fuel to the common rail.

As shown in FIG. 1, the sac bore cylinder 10 is a metal component, which has a cylinder part 20 and a discharge part 30. The cylinder part 20 and the discharge part 30 are formed integrally by machining a metal block. The sac bore cylinder 10 is a metal body, in which a closed passage 21a described later and a branch passage 31a, 32a are formed. In the cylinder part 20, the fuel is pressurized by the piston, which is not shown, and the high-pressure fuel pressurized in the cylinder part 20 is discharged from the discharge part 30.

Inside the cylinder part 20, a closed passage 21a is formed in a shape, which extends straightly in a predetermined direction (up-down direction in FIG. 1) and is closed at its top end (top side in FIG. 1). The closed passage 21a has a circular shape in cross-section. The predetermined direction is a direction of elongation, in which a center line C1 of the closed passage 21a extends. An opening 21b of the closed passage 21a, which is located at an end surface of the cylinder part 20, is in a circular shape, when viewed in the direction of the center line C1 (form bottom side in FIG. 1). A part of the cylinder part 20 forming the opening 21b is in a cylindrical shape, which extends longitudinally in the direction of the center line C1. A center line of the cylinder part 20 and the center line C1 of the closed passage 21a coincide.

Figure 2:
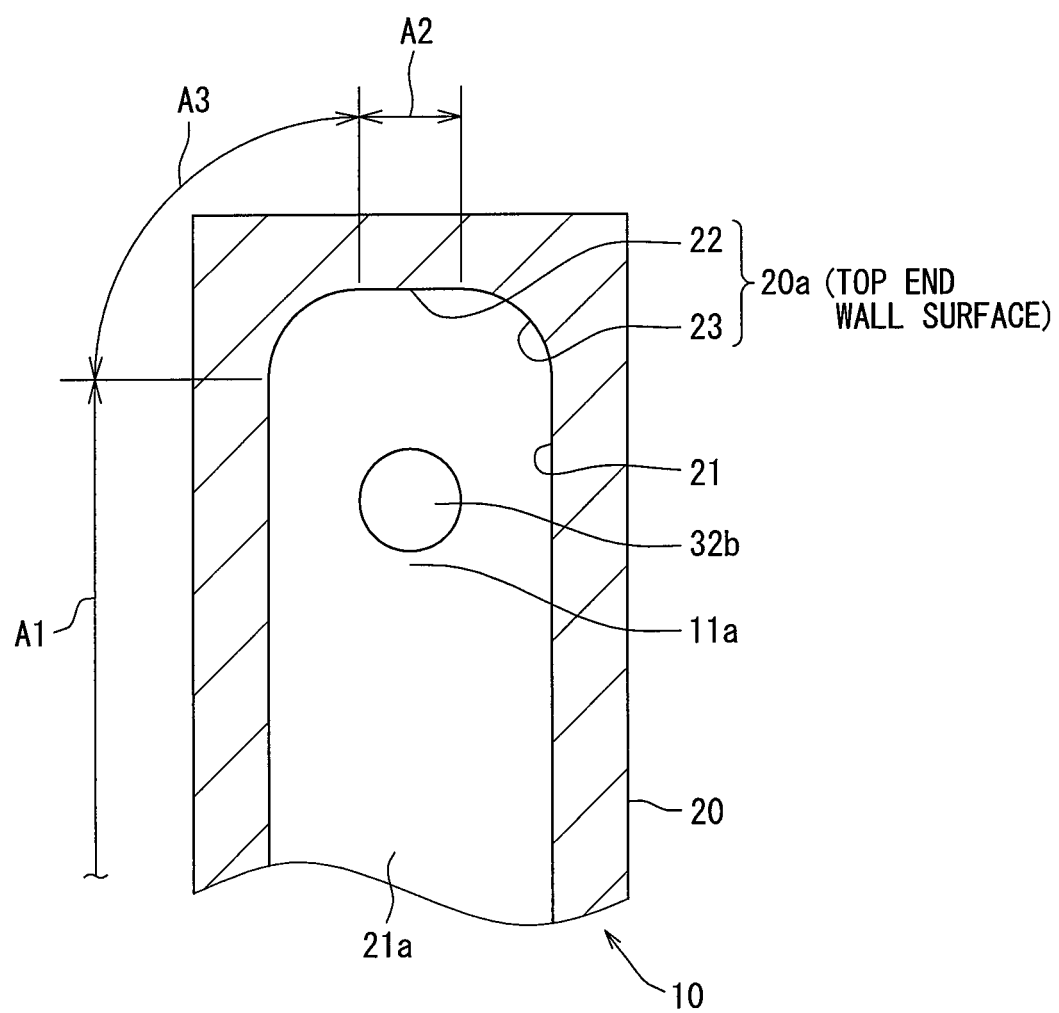
FIG. 2 is a sectional view taken along a line II-II in FIG. 1.

As shown in FIG. 1 and FIG. 2, among a wall surface forming a top end part of the closed side of the closed passage 21a, a surface perpendicular to the direction of the center line C1 (predetermined direction) of the closed passage 21a is referred to as a ceiling wall surface 22 and a surface parallel to the direction of the center line C1 is referred to a passage wall surface 21. The passage wall surface 21, the ceiling wall surface 22 and a connecting wall surface 23 are formed of a metal integrally by machining. A surface connecting the ceiling wall surface 22 and the passage wall surface 21 is referred to as the connecting wall surface 23. In FIG. 2, reference symbol A1 indicates a range of the passage wall surface 21, reference symbol A2 indicates a range of the ceiling wall surface 22 and reference symbol A3 indicates a range of the connecting wall surface 23.

The passage wall surface 21 is an annular peripheral surface with its center on the center line C1 and in an annular ring shape when viewed in the direction of the center line C1. The ceiling wall surface 22 is a flat surface extending perpendicularly relative to the center line C1 and in a circular shape when viewed in the direction of the center line C1. The connecting surface 23 extends annularly with its center on the center line C1 and is in a shape, which is curved in a direction to expand the closed passage 21a. That is, the connecting wall surface 23 is in an arcuate shape curved in a radially outward direction in a sectional view including the center line C1. The connecting wall surface 23 is thus in a convex shape in the radially outward direction.

In the first embodiment, the wall surface forming the top end part of the closed side of the closed passage 21a is referred to as a top end wall surface 20a. The top end wall surface 20a includes at least the ceiling wall surface 22 and the connecting wall surface 23. The diameter of the closed passage 21a is uniform in the range of the passage wall surface 21 indicated by the reference symbol A1 and is decreased gradually in the direction to the ceiling wall surface 22 in the range of the connecting wall surface 23 indicated by the reference symbol A3.

Inside the discharge part 30, branch passages 31a and 32a are formed to branch off from the closed passage 21a. A direction of a center line C2 of the branch passages 31a and 32a is perpendicular to the direction of the center line C1 (predetermined direction). The branch passages 31a and 32a are in a circular shape in cross section. An opening 31b of the branch passage 31a located at the end surface of the discharge part 30 is circular when viewed in the direction of the center line C2 (from right side in FIG. 1). A part of the discharge part 30 forming the opening 31b is in a cylindrical shape, which extends in the direction of the center line C2.

Because of crossing of the center line C2 of the branch passages 31a and 32a and the center line C1 of the closed passage 21a at right angle (90°), a communication opening 32b of the branch passages 31a and 32a communicating with the closed passage 21a is in a circular shape when viewed in the direction of the center line C2.

The communication opening 32b is smaller in diameter than the opening 31b formed in an end surface of the discharge part 30. In the branch passages 31a and 32a, a part including the communication opening 32b is referred to as a small-diameter branch passage 32a and a part including the opening 31b is referred to as a large-diameter passage 31a. A passage diameter of the small-diameter branch passage 32a is set to be smaller than that of the large-diameter branch passage 31a. A wall surface forming the large-diameter branch passage 31a is referred to as a large-diameter wall surface 31 and a wall surface forming the small-diameter branch passage 32a is referred to as a small-diameter wall surface 32. The communication opening 32b is formed in the passage wall surface 21. To be more in detail, a whole part of the communication opening 32b is located in the passage wall surface 21. That is, the whole part of the connecting wall surface 23 is located at a side (top side in FIG. 1 and FIG. 2) of the ceiling wall surface 22 relative to the communication opening 32b.

Among the sack bore cylinder 10 (body), a part, at which the passage wall surface 21 of the closed passage 21a and the small-diameter wall surface 32 of the branch passage 32a cross, is referred to as a crossing part 11. The crossing part 11 is a part, which is around the communication opening 32b. In the crossing part 11, a part (corner part) adjacent to the communication opening 32b is in a shape of right angle as shown in the sectional view shown in FIG. 1. The crossing part 11 is processed by shot-peening as described later so that the tensile stress is removed and the residual compressive stress is applied.

Figure 3:
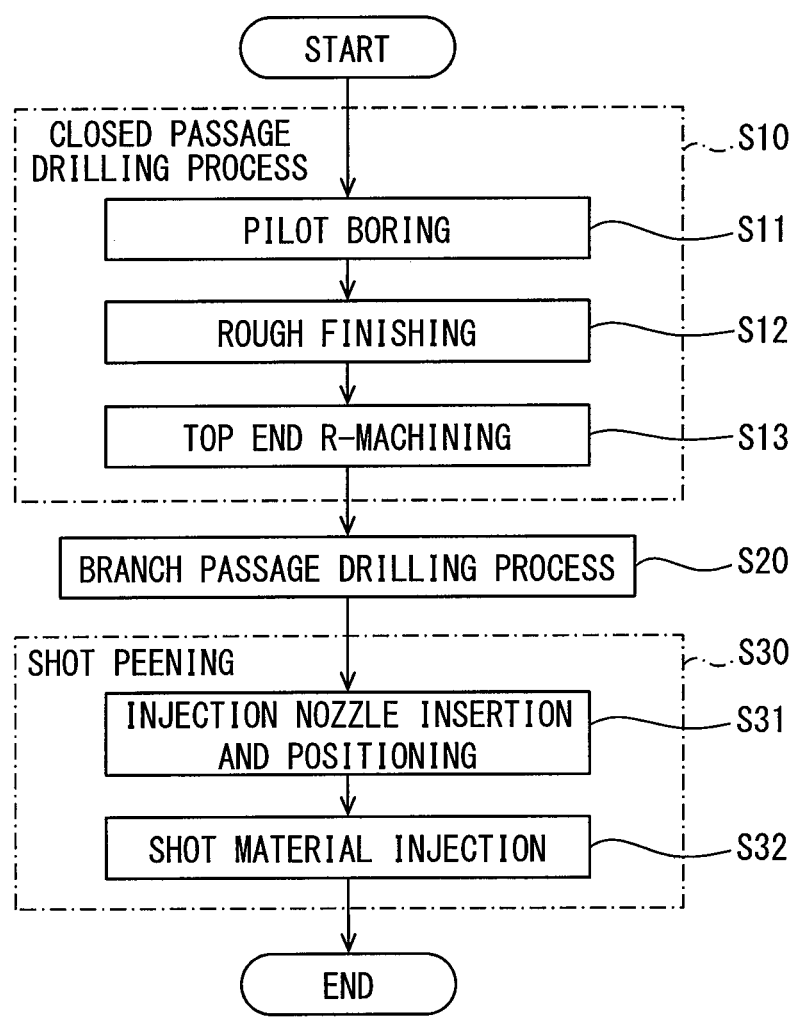
FIG. 3 is a flowchart showing processes of a method of manufacturing the fluid passage device in the first embodiment.

A manufacturing process of the sac bore cylinder 10 (fluid passage device) provided in the high-pressure fuel pump will be described next with reference to FIG. 3.

First, a metal product is provided by machining an outer surface of a metal base material. This metal product does not have the closed passage 21a nor the branch passages 31a and 32a at this stage. At step S10 (boring process) shown in FIG. 3, the closed passage 21a is formed by drill-boring a bore in the metal product.

Figure 4:
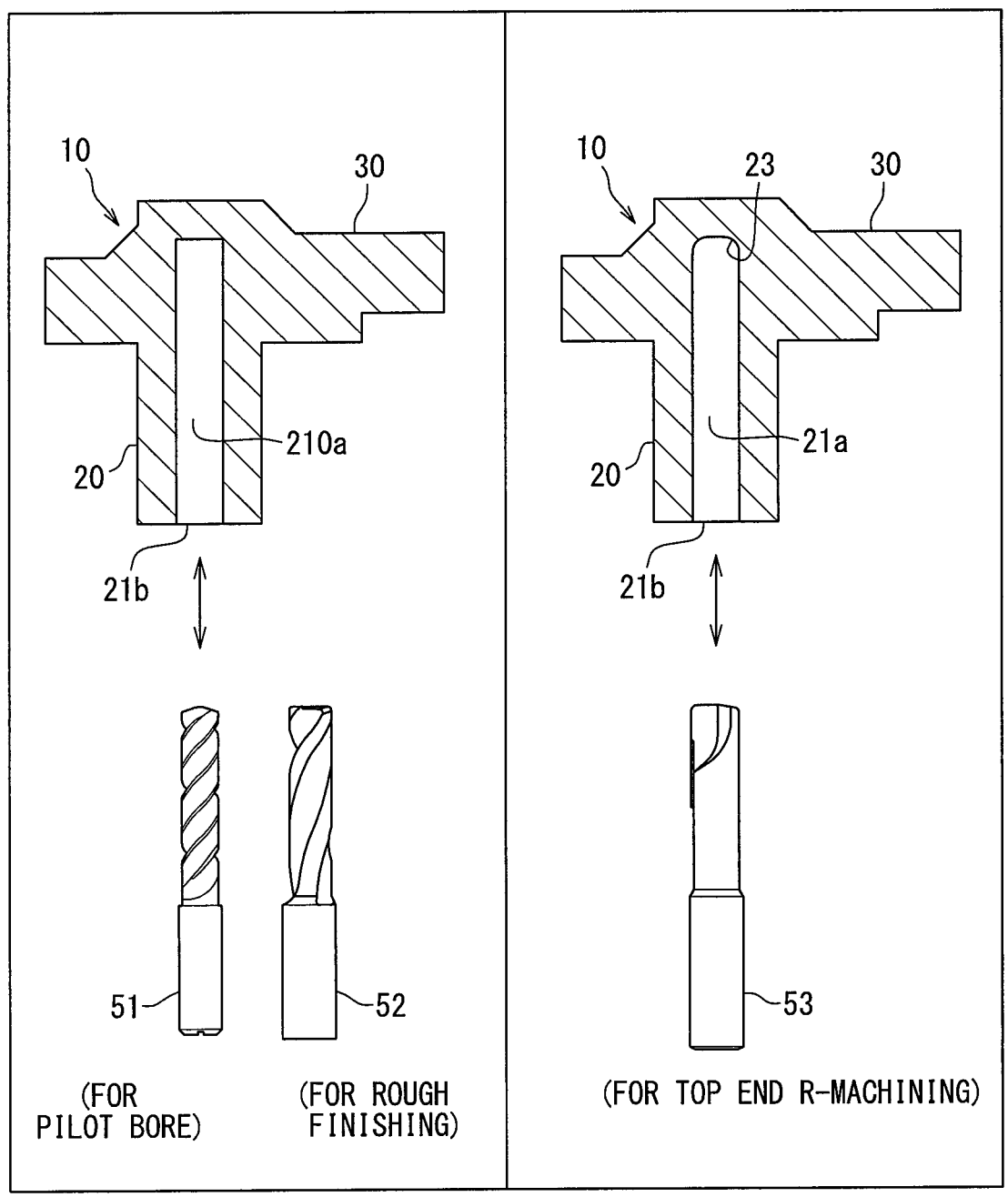
FIG. 4 is a diagrammatic view showing a drill used in a boring process in the first embodiment.

In the drilling process at step S10, as shown in FIG. 4, a pilot bore 210a is formed at a location, which corresponds to the closed passage 21a of the body, at step S11 by a pilot-bore drill 51. The boring is limited so that the pilot-bore drill 51 does not penetrate the body. At next step S12, the pilot bore 210a is bored to a desired diameter by a rough-finishing drill 52. At next step S13, the connecting wall surface 23 is formed to a desired radius of curvature by a top end R-machining drill.

After boring the closed passage 21a at step S10, the branch passages 31a and 32a are formed by drilling bores in the metal product, in which the closed passage 21a is formed, at step S20. More specifically, the pilot bore is drilled first by the pilot-bore drill at a location, which corresponds to the branch passages 31a and 32a of the body. Then, the small-diameter branch passage 32a is formed by a small-diameter drill and subsequently the large-diameter branch passage 31a is formed by a large-diameter branch passage 32a.

Figure 5:
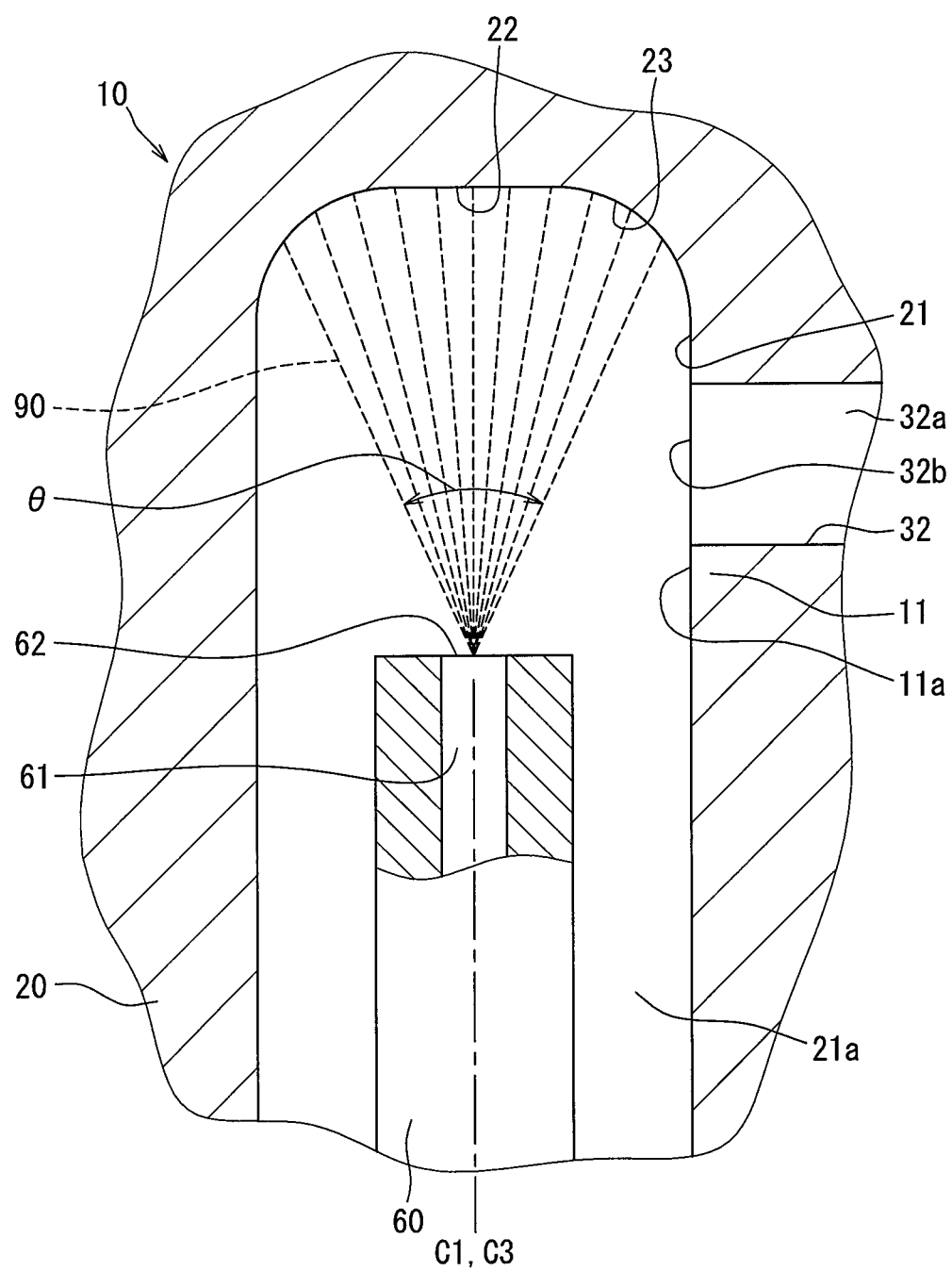
FIG. 5 is a sectional view showing a state of injecting shot materials in the first embodiment.

At step S20, after boring the branch passages 31a and 32a, a shot peening is performed at the crossing part 11 of the body, that is, at the part to which the residual compressive stress is to be applied, at the following step S30. More specifically, at step S31 (shot preparation process), an injection nozzle 60 shown in FIG. 5 is inserted into the closed passage 21a from the opening 21b (bottom side in FIG. 1). The injection nozzle 60 is a piping, which injects shot materials 90 such as glass beads. The injection nozzle 60 is formed inside a shot passage 61 for supplying the shot materials 90. The shot materials 90 are injected from an injection opening 62, which is an open end of a shot passage 61.

The injection nozzle 60 is placed in position so that a center line C3 of the injection nozzle 60 coincide the center line C1. The injection nozzle 60 is positioned so that the injection opening 62 is located at a front side (opening 21b side) of the communication opening 32b and faces the ceiling wall surface 22. After thus positioning the injection nozzle 60, the shot materials 90 are injected from the injection opening 62 at next step S32 (shot process).

Figure 6:
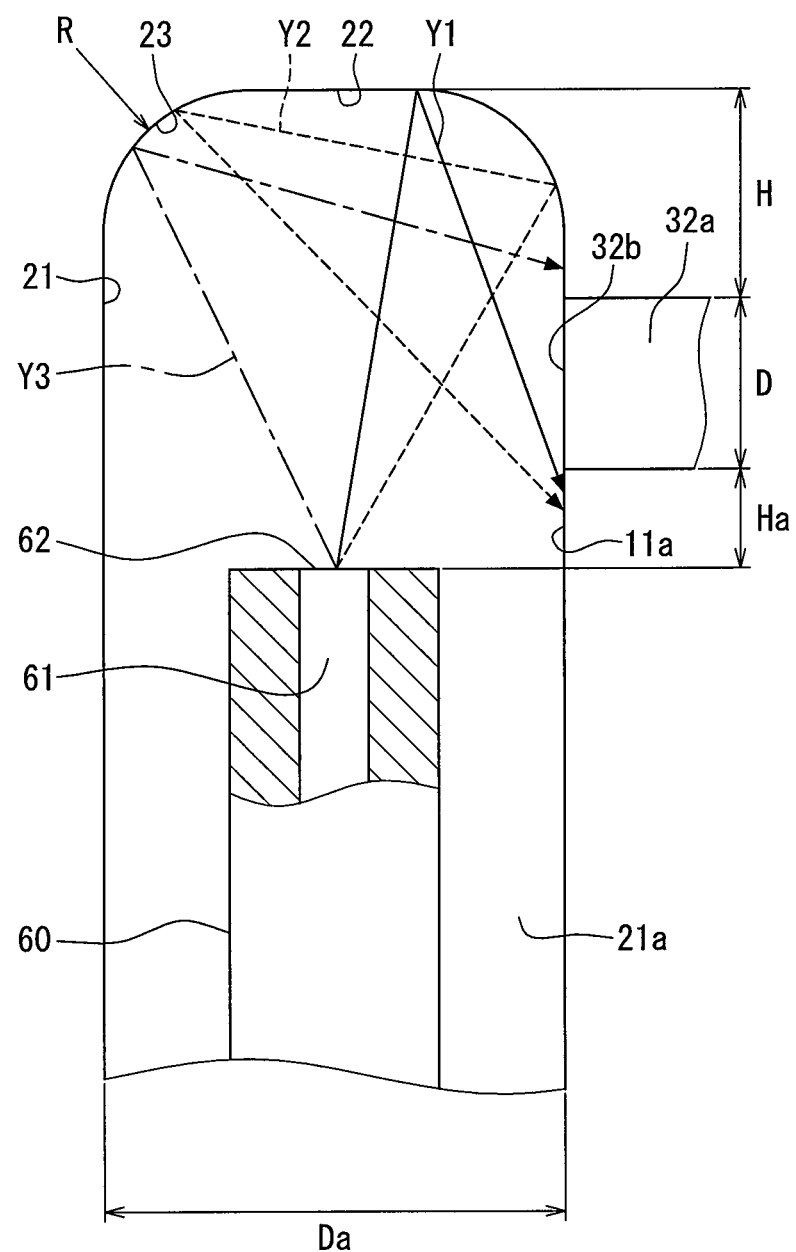
FIG. 6 is a schematic view showing a reflection path of the shot materials in the first embodiment.
Figure 7:
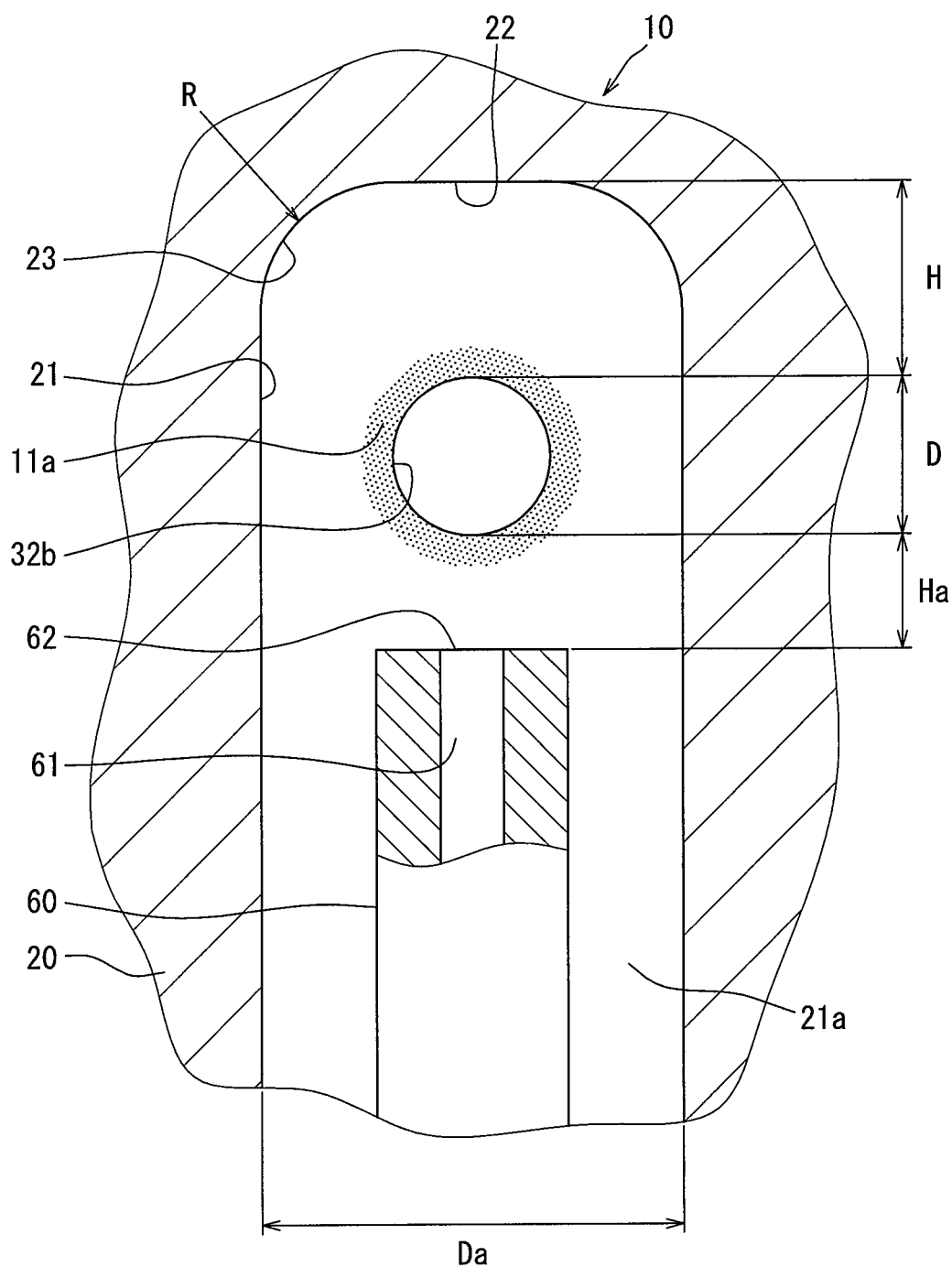
FIG. 7 is a sectional view showing a range, which requires shot peening, in the first embodiment.

As shown in FIG. 6, the shot materials 90 injected from the injection opening 62 reflect on the ceiling wall surface 22 and the connecting wall surface 23 (top end wall surface 20a) and then collide a reforming surface 11a, which forms the passage wall surface 21 in the crossing part 11 of the body. In FIG. 7, a part indicated by dots corresponds to the reforming surface 11a, which the shot materials 90 collide.

A path Y1 indicated by a solid line in FIG. 6 indicates a path, along which the shot materials 90 injected from the injection opening 62 collide the reforming surface 11a after colliding the ceiling wall surface 22. A path Y2 indicated by a dotted line in FIG. 6 indicates a path, along which the shot materials 90 injected from the injection opening 62 collide the reforming surface 11a after colliding the connecting wall surface 23 and then the ceiling wall surface 22. A path Y3 indicated by a one-dot chain line in FIG. 6 indicates a path, along which the shot materials 90 injected from the injection opening 62 collide the reforming surface 11a after colliding the connecting wall surface 23. The paths Y1 and Y3 show examples of collisions with the reforming surface 11a after one reflection at the top end wall surface 20a. The path Y2 shows an example of collision at the reforming surface 11a after two reflections at the top end wall surface 20a.

It is preferred that the shot materials 90 injected from the injection opening 62, which do not collide the reforming surface 11a, are as little as possible. It is further preferred that the number of times of reflections of the shot materials 90 at the top end wall surface 20a is two times or smaller even in case of collision on the reforming surface 11a. That is, it is preferred that as many as shot materials 90 collide the reforming surface 11a after two or smaller number of times of reflections. For attaining the preferred collision state, various dimensions are set as follows.

As shown in FIG. 6 and FIG. 7, the closed passage 21a is set to have a diameter Da, the small-diameter branch passage 32a (branch passage) is set to have a diameter D, and the connecting wall surface 23 is set to have a radius of curvature R. A length in the predetermined direction (in the direction of the center line C1) from the small-diameter branch passage 32a to the ceiling wall surface 22 is set to H. More specifically, the length in the predetermined direction from the end part of the communication opening 32 on the ceiling wall surface 22 side is H. A length in the predetermined direction from the branch passage 32a to the injection nozzle 60 is set to Ha. Specifically, the length in the predetermined direction from the end part of the communication opening 32b on the injection nozzle 60 side to the injection opening 62 is set to Ha. That is, the injection nozzle 60 is positioned with its injection opening 62 being near to the opening 21b by the length Ha from the communication opening 32a.

A simulation was conducted by the present inventor with respect to changes of the probability of collision on the reforming surface 11a in two or smaller number of reflections changes under variations of five parameters Da, D, R, H and Ha described above. FIG. 8 shows a simulation result, which indicates a relation between the probability of collision (%) of the shot materials 90 with the reforming surface 11a in two or smaller number of reflections.

In this simulation, twenty three combinations of the parameters No. 1 to No. 23 are set and the probability is calculated for each combination of five parameters. Each parameter value in twenty three combinations of parameters is determined based on DOE (design of experiments).

For example, the parameter values in the combination NO. 8 in FIG. 8 are R=0.5 mm, H=3.2 mm, Da=6.42 mm, D=1 mm and Ha=3 mm. Under this exemplary condition, among one hundred shots injected at a uniform angular interval, the number of collisions of the shot materials 90 with the reforming surface 11a without reflection (no reflection) at any wall surfaces is two, the number of collisions of the shot materials 90 with the reforming surface 11a after one reflection at the top end wall surface 20a is six and the number of collisions of the shot materials 90 with the reforming surface 11a after two reflections at the top end wall surface 20a is eleven. For this reason, the number of shot materials 90, which collide the reforming surface 11a after two or smaller number of reflections, is nineteen among one hundred. That is, the probability of the collision on the reforming surface 11a after two or smaller number of reflections is 19%. Each probability of twenty three combinations calculated in the similar manner as described above is indicated at the right-most column in the table shown in FIG. 8.

Next, a relation between the five parameters and the probability is calculated based on the simulation result shown in FIG. 8. For example, based on RSM (response surface methodology), a combination of parameter values, which leads to a maximum value of the probability (maximum probability), is searched. Then, a range of parameter values, which include the parameter values leading to the maximum probability described above and leads to a probability of 95% or higher percentage of the maximum probability. The following is described based on this calculation result. That is, by setting four parameters Da, D, R and H to satisfy the conditions of equation 1, equation 2 and equation 3, it is possible to attain a high probability (collision probability), which is equal to or higher than 95% of the maximum probability. This conclusion is on an assumption that Ha is set in a range from 0 mm to 3 mm.

$$f1(D,Da,R)=(0.019 \times Da-0.0050 \times D+0.077) \times R+(0.16 \times Da-0.68 \times D+0.70)$$ [Equation 1]

$$f2(D,Da,R)=(-0.018 \times Da+0.011 \times D+0.35) \times R+(0.16 \times Da-0.49 \times D+1.6)$$ [Equation 2]

$$f1(D,Da,R) \leq H \leq f2(D,Da,R)$$ [Equation 3]

In summary, f1(D, Da, R) of equation 1 is a function, which determines a lower limit value of H by using D, Da and R as the parameters. f2(D, Da, R) of equation 2 is a function, which determines a higher limit value of H by using D, Da and R as the parameters. It is confirmed by the inventor that the equations 1 to 3 are appropriate for three patterns of Ha=0, Ha=1.5 and Ha=3.

An angle θ of diffusion (refer to FIG. 5) of the shot materials injected from the injection opening 62 is highly likely to be in a range from 90° to 120° in actuality and hence it is assumed in the simulation described above that the diffusion angle θ is 120°. It is confirmed by the inventor that the equations 1 to 3 are still appropriate as far as the diffusion angle θ is in a range from 90° to 120° even in case that it is other than 120°.

In view of the point described above, the injection nozzle 60 is positioned at step S31 so that Ha is within the range from 0 mm to 3 mm and the shot materials 90 are injected at step S32 so that the diffusion angle θ is in the range from 90° to 120°. As a result, the shot materials 90 injected from the opening 62 are expected to collide the reforming surface 11a with a probability of collision, which is equal to or higher than 95% of the maximum probability.

In the simulation described above, it is checked whether the shot materials 90 collide the reforming surface 11a based on an assumption that the shot materials 90 collide reforming surface 11a in case that the shot materials 90 collide an area, which is wider than the communication opening 32b by 1 mm in the radial direction of the communication opening 32b. In case that the widened area is large than 1 mm, the probability of collision is further increased. For this reason, it is assumed that the widened area in the simulation described above is equal to 1 mm or more.

In case that H is set to be smaller than the lower limit value f1 (D, Da, R), the number of the shot materials 90, which collide the reforming surface 11a along the path Y2 shown in FIG. 6, decreases and the probability of collision on the reforming surface 11a correspondingly decreases. In case that H is set to be larger than the higher limit value f2 (D, Da, R), the number of the shot materials 90, which collide in case that H is set to be smaller than the lower limit f1 (D, Da, R), the number of the shot materials 90, which collide the reforming surface 11a along the path Y2 shown in FIG. 6, decreases and the probability of collision with the reforming surface 11a correspondingly decreases.

At step S10, the closed passage 21a is formed so that the values of Da, D, R and H satisfy all conditions of the equation 1, the equation 2 and the equation 3. For example, at step S13, the connecting wall surface 23a is formed to have an optimum R by selecting the top end R-machining drill 53 having the value of R (optimum R), which satisfies the conditions described above. At steps S11 and S12, the passage wall surface 21 is formed to have an optimum length H in the predetermined direction by adjusting a depth of boring by the drill 51 and the drill 52 to satisfy the value H (optimum H), which satisfies the conditions described above. Similarly, the closed passage 21a and the small-diameter branch passage 32a are drilled so that an optimum Da and an optimum D, which satisfy the conditions described above, are attained.

It is alternatively possible to set the values of Da and D based on power required for the sac bore cylinder 10 and perform a step of forming bores (boring processes) at steps S10 and S20 to attain the set values. In this case, two parameters R and H may be set to satisfy all conditions of the equation 1, the equation 2 and the equation 3 by substituting the set values of Da and D for the equation 1 and the equation 2.

As described above, in the manufacturing method according to the first embodiment, the closed passage 21a is formed by the boring step S10, the injection nozzle 60 is inserted into the closed passage 21a at the following shot preparation step S31 and the shot materials 90 are injected from the injection opening 62 in the insertion direction at the following shot step S32. In the shot preparation step S31, the injection opening 62 is located at a position, which is nearer to the opening 21b than the small-diameter branch passage 32a (branch passage) is in the insertion direction. In the shot step S32, the shot materials 90 injected from the injection opening 62 are caused to reflect at the top end wall surface 20a, which forms the top end part of the closed passage 21a and collide the crossing part 11.

Thus, since the shot materials 90 are caused to collide the crossing part 11 (corner part) by reflecting the shot materials 90 at the top end wall surface 20a of the body, the sac bore cylinder 10 (body) performs the reflection function of the conventional reflection member, which is provided separately. As a result, the conventional reflection member need not be used and frequent replacements of worn-out parts are reduced.

Further, in the manufacturing method according to the first embodiment, the connecting wall surface 23 is curved in shape to expand the closed passage 21a. As a result, it is possible to collide the shot materials 90 reflected at the top end wall surface 20a on the reforming surface 11a with high probability in comparison to a case that the connecting wall surface 23 is not shaped to curve, for example, the connecting wall surface 23 is in a taper shape, which connects the end part of the ceiling wall surface 22 and the end part of the passage wall surface 21 straightly.

Further, the high-pressure fuel pump (fluid passage device) according to the first embodiment has the metal body (sac bore cylinder 10), inside which the closed passage 21a and the branch passages 31a and 32a are formed. The closed passage 21a is shaped to extend straightly in the predetermined direction and closed at the top end. The branch passages 31a and 32a are branched off from the closed passage 21a. The wall surface forming the top end part of the closed passage 21a includes the ceiling wall surface 22, the passage wall surface 21 and the connecting wall surface 23. The ceiling wall surface 22 is perpendicular to the predetermined direction of the closed passage 21a. The passage wall surface 21 is parallel to the predetermined direction of the closed passage 21a. The connecting wall surface 23 is shaped to connect the ceiling wall surface 22 and the passage wall surface 21 and curve to expand the closed passage 21a in the radially outward direction.

As a result, it is possible to apply the residual compressive stress by colliding the shot materials 90 on the crossing part 11, which is likely to be damaged by stress concentration, in the following manner. That is, in case of inserting the injection nozzle 60 from the opening 21b of the closed passage 21a and injecting the shot materials 90 from the injection nozzle 60 in the direction of the center line C1 (insertion direction) of the closed passage 21a, it is possible to cause the shot materials 90 to reflect at the connecting wall surface 23 and collide the crossing part with high probability. As a result, since the body itself has the reflection function of the conventional reflection member, the conventional reflection member need not be used and the replacement of worn-out parts is reduced.

Still further, in the manufacturing method and the high-pressure fuel pump according to the first embodiment, four parameters H, D, Da and R are set to satisfy the conditions of the equations 1 to 3 described above. Da is the diameter of the closed passage 21a. D is the diameter of the small-diameter branch passage 32a (branch passage). R is the radius of curvature of the connecting wall surface 23. H is the length from the ceiling wall surface 22 to the small-diameter branch passage 32a in the direction of the center line C1 (predetermined direction). The equations 1 to 3 are derived by numerical analysis so that the shot materials 90 collide the reforming surface 11a after reflection at the top end wall surface 20a with a sufficiently high probability.

Specifically, the ranges of combinations of the parameters H, D, Da and R are numerically analyzed to attain high collision probability, which is equal to or higher than 95% of the maximum probability of collision with the reforming surface 11a after two or smaller number of reflections. According to the first embodiment, which satisfies the conditions of equations 1 to 3, since high probability of collision, which is as high as 95% or higher percentage of the maximum probability is attained, it is possible to shorten a period of shot peening process.

Second Embodiment

Figure 9:
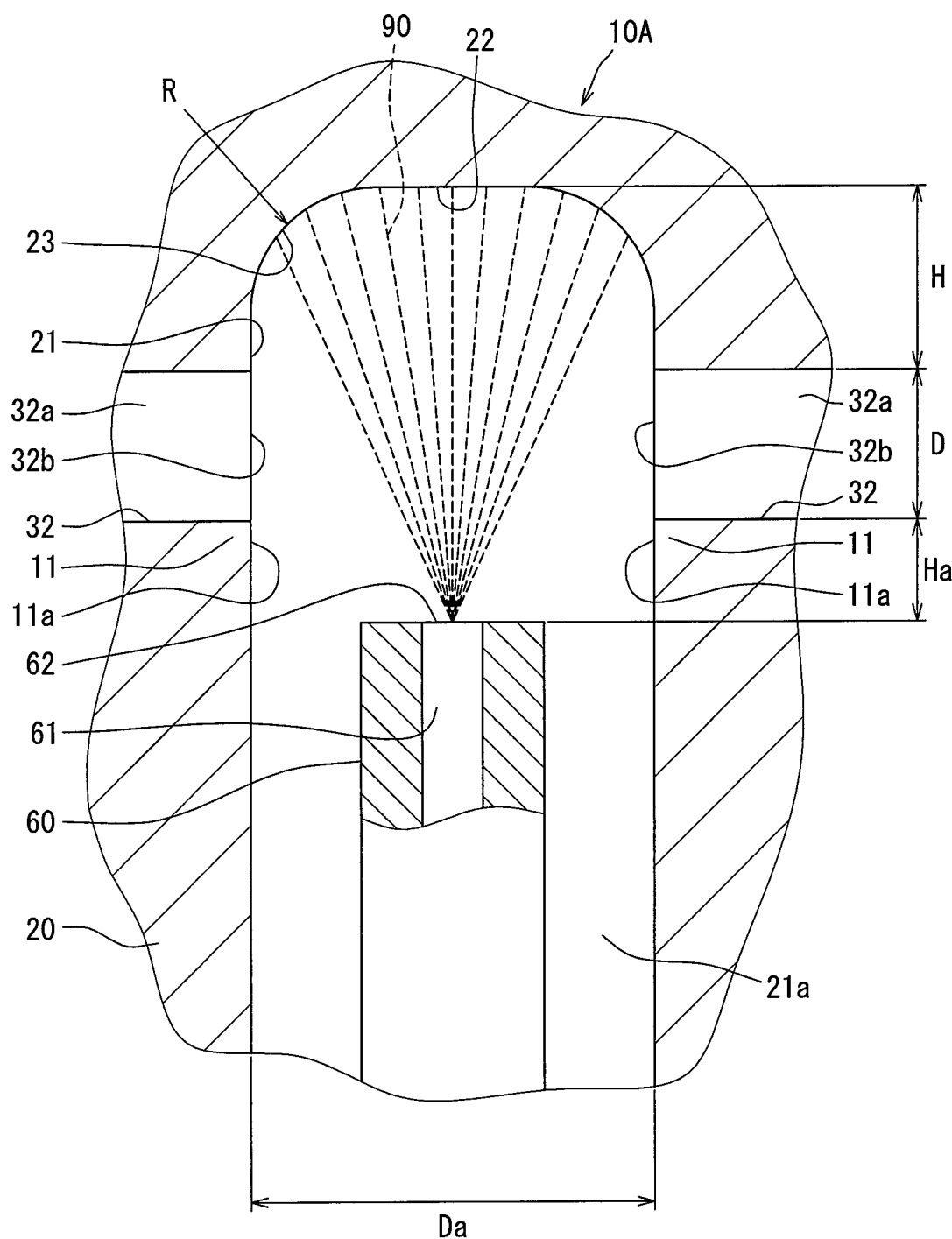
FIG. 9 is a sectional view showing a fluid passage device according to a second embodiment.

The sac bore cylinder 10 according to the first embodiment has only one reforming surface 11a, which needs the shot peening. According to a second embodiment, however, two reforming surfaces 11a are provided as shown in FIG. 9.

Specifically, a sac bore cylinder 10A has two branch passages (small-diameter branch passages 32a) in the second embodiment. The small-diameter branch passages 32a are located at the same position in the direction of insertion of the injection nozzle 60 (up-down direction in FIG. 9). Two communication openings 32b are provided to face each other. The other structure and manufacturing method are generally the same as those of the first embodiment. The second embodiment is different however in that the reforming surfaces 11a provided at two locations are subjected to one shot peening of the shot materials 90 injected from the injection nozzle 60.

In the second embodiment, in which the reforming surfaces 11a are provided at multiple locations, the injection opening 62 is located at the position, which is nearer to the position of insertion of the injection nozzle 60 than the small-diameter branch passages 32a (branch passages) in the shot preparation step S31. In the shot step S32, the shot materials 90 injected from the injection opening 62 are caused to collide the crossing parts 11 provided at two locations after reflecting at the top end wall surface 20a, which forms the top end part of the closed passage 21a.

For colliding the shot materials 90 on the crossing parts 11 (corner parts) provided at two locations, the shot materials 90 are reflected at the top end wall surface 20a of the body for collision. As a result, by performing the function of reflection performed by the conventional reflection member by the sack bore cylinder 10B (body), the conventional reflection member is not needed and worn-out parts need not be replaced frequently.

Third Embodiment

Figure 10:
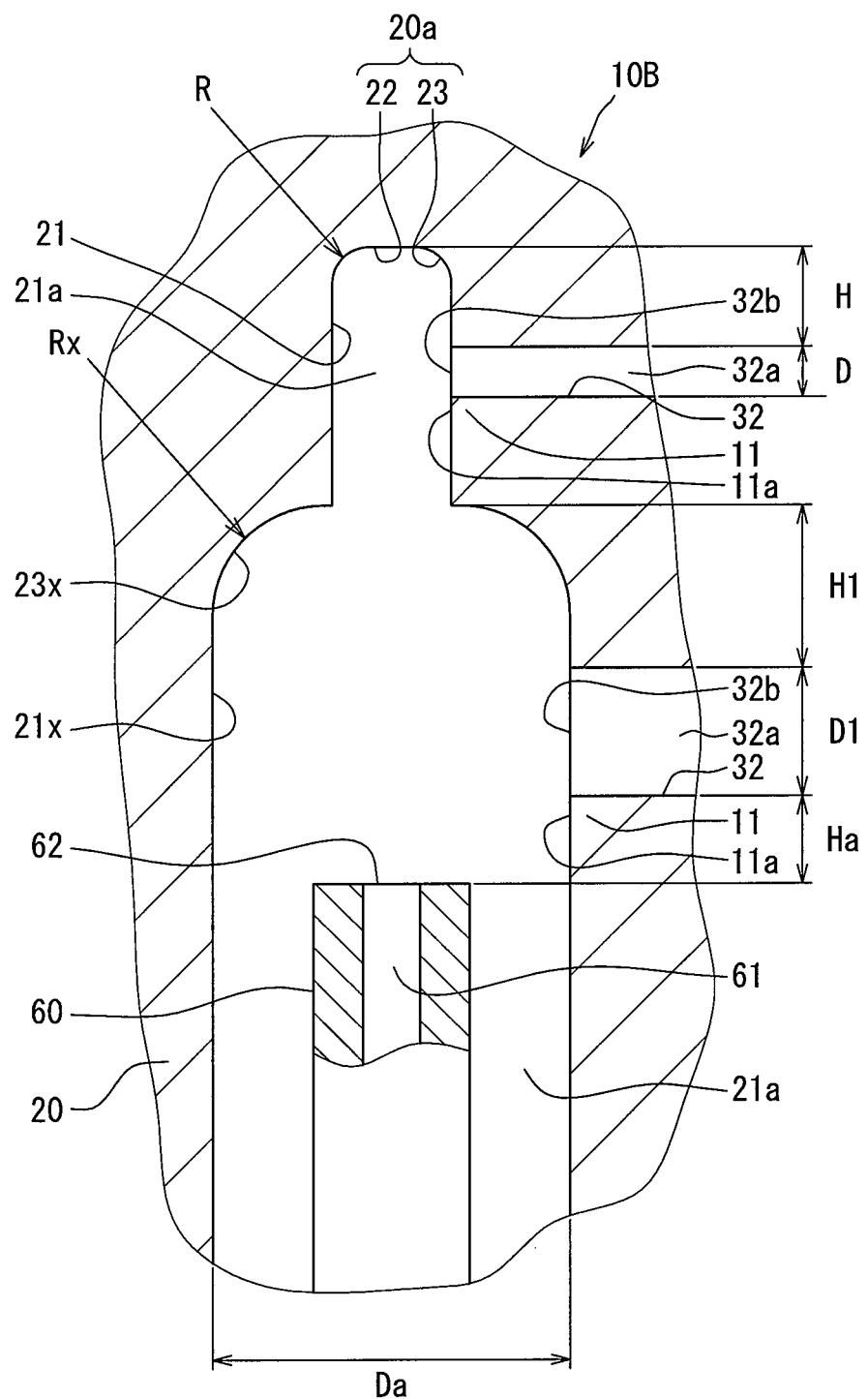
FIG. 10 is a sectional view showing a fluid passage device according to a third embodiment.

In the second embodiment, two reforming surfaces 11a are provided at the same position in the direction of insertion of the injection nozzle (up-down direction in FIG. 9). In a third embodiment, however, two reforming surfaces 11a are provided at different positions in the direction of insertion of the injection nozzle as shown in FIG. 10.

Specifically, a sac bore cylinder 10C according to the third embodiment is provided with two branch passages (small-diameter branch passages 32a). The two small-diameter branch passages 32a are provided at different positions in the direction of insertion of the injection nozzle (up-down direction in FIG. 10). A diameter of the small-diameter branch passage 32a located at a far side in the direction of insertion (top side in FIG. 10) is smaller than that of the small-diameter branch passage 32a located at a near side (bottom side in FIG. 10). That is, the communication opening 32b provided at the far side is smaller than the communication opening 32b provided at the near side. A position of the small-diameter branch passage 32a at the far side and a position of the small-diameter branch passage 32a at the near side are the same in the circumferential direction. The diameter of the closed passage 21a communicated with the communication opening 32b of the far side is smaller than that of the closed passage 21a communicated with the communication opening 32b of the near side.

The ceiling wall surface 22 is located near the closed passage 21a of the far side in the third embodiment. According to the third embodiment, the passage wall surface 21 and the connecting wall surface 23 are provided in the closed passage 21a of the far side. The top end wall surface 20a, which includes the passage wall surface 21 and the connecting wall surface 23, is provided in the closed passage 21a of the closed passage 21a. The wall surface, which forms the closed passage 21a of the near side, is assumed to have a near-side passage wall surface 21x and a near-side connecting passage wall surface 23x. The near-side passage wall surface 21x is parallel to the direction of injection nozzle insertion (up-down direction in FIG. 10). The near-side connecting passage wall surface 23x connects the wall surface 21 and the near-side passage wall surface 21x. The near-side connecting wall surface 23x is in a curved shape, which expands the near-side closed passage 21a in the radially outward direction.

The other structure and manufacturing method are generally the same as those of the second embodiment. The third embodiment is different however in that the injection opening 62 is located nearer to the opening 21b than the small-diameter branch passage 32a, which is nearer to the opening 21b, is.

In the third embodiment, in which the reforming surfaces 11a are provided at different locations in the direction of insertion, the injection opening 62 is located at the position, which is nearer to the position of the insertion of the injection nozzle 60 than the small-diameter branch passages 32a (branch passages) in the shot preparation step S31. More specifically, the injection opening 62 is located at a position, which is nearer to the position of insertion than the small-diameter branch passage 32a of the near side. In the shot step S32, the shot materials 90 injected from the injection opening 62 collide the crossing parts 11 after being reflected at the top end wall surface 20a, which forms the top end part of the closed passage 21a of the far side.

For colliding the shot materials 90 on the crossing parts 11 (corner parts) provided at two locations, the shot materials 90 are reflected at the top end wall surface 20a, the passage wall surface 21, the near-side connecting wall surface 23x and the near-side passage wall surface 21x of the body for collision. As a result, by performing the function of reflection performed by the conventional reflection member by the sack bore cylinder 10B (body), the conventional reflection member is not needed and worn-out parts need not be replaced frequently.

Other Embodiment

Although the preferred embodiments of the fluid passage device and the manufacturing method of the same are described above, the fluid passage device and the manufacturing method are not limited to the embodiments described above but may be modified in various ways as exemplified below. Without being limited to the combinations described expressly in detail in each embodiment, the embodiments may be combined partly unless the combination results in inoperativeness.

In the first embodiment, the equations 1 to 3 are calculated to be within the range of parameters, which provide the probability of more than a predetermined percentage of the maximum probability, and the predetermined percentage is set to 95%. However, the predetermined percentage may be set to be higher than 95% or lower than 95%, for example, 90%, 85%, 80% and the like.

In the first embodiment, it is preferred that the range of H is from 0 mm to 3.2 mm and the range of R is from 0.5 mm to 3.2 mm in case that D is in the range from 1.0 mm to 2.1 mm. The four parameters Da, D, R and H may be set to satisfy the relation of H>D or H<D in addition to satisfying the equations 1 to 3.

In the first embodiment, the injection nozzle 60 is positioned at step S31 so that Ha is in the range from 0 mm to 3 mm and the shot materials 90 are injected at step S32 so that the diffusion angle θ is in the range from 90° to 120°. Alternatively, the shot materials 90 may be injected by setting Ha to be 3 mm or larger or by setting the diffusion angle θ to be outside the range from 90° to 120°.

In each embodiment described above, the connecting wall surface 23 is shaped to curve to the direction, which expands the closed passage 21a. Alternatively, the connecting wall surface 23 may be in a taper shape or a rectangular shape. In the second and third embodiments, the reforming surfaces 11a, to which the shot peening is required, are provided at two locations. Alternatively, the reforming surfaces 11a may be provided at three or more locations.

In the first embodiment, the injection nozzle 60 is positioned so that the center line C3 of the injection nozzle 60 and the center line C1 of the closed passage 21a coincide. Alternatively, the center line C3 of the injection nozzle 60 may be positioned to be deviated from the center line C1 of the closed passage 21a.

In the second embodiment, two communication openings 32b are located to face each other and deviated 180° in the circumferential direction. Alternatively, the two communication openings 32b may be located not to face each other.

In each embodiment described above, the closed passage 21a and the branch passages are provided by drill-machining process. Alternatively, at least one of the closed passage 21a and the branch passages may be provided by laser process.

In each embodiment described above, the fluid passage device is used in the high-pressure fuel pump, the fluid passage device may be used in any devices other than the high-pressure fuel pump as far as the metal body is provided with the closed passage having the closed top end and the branch passage branched from the closed passage. For example, the fluid passage device may be used in a fuel injection valve, which injects fuel for combustion in an internal combustion engine, or in a common rail, which distributes high-pressure fuel to fuel injection valves.

What is claimed is:

1. A fluid passage device including a passage for flowing fluid, the fluid passage comprising:
a metal body including therein a closed passage, which is shaped to extend straightly in a predetermined direction and has a closed top end, and a branch passage, which is branched off from the closed passage, wherein
a top end part of the closed passage at a closed side is defined by a ceiling wall surface, which is perpendicular to the predetermined direction, a passage wall surface, which is parallel to the predetermined direction, and a connecting wall surface, which connects the ceiling wall surface and the passage wall surface, the connecting wall surface is shaped to curve in a direction to expand the closed passage, and the fluid passage satisfies the following equations 1, 2 and 3:

$$f1(D,Da,R)=(0.019 \times Da-0.0050 \times D+0.077) \times R+(0.16 \times Da-0.68 \times D+0.70);$$ [Equation 1]

$$f2(D,Da,R)=(-0.018 \times Da+0.011 \times D+0.35) \times R+(0.16 \times Da-0.49 \times D+1.6); \text{ and}$$ [Equation 2]

$$f1(D,Da,R) \leq H \leq f2(D,Da,R),$$ [Equation 3]

assuming that

D is a diameter of the branch passage,
Da is a diameter of the closed passage,
R is a radius of curvature of the connecting surface,
H is a length from the ceiling wall surface to the branch passage in the predetermined direction,
f1(D, Da, R) is a function, which determines a lower limit value of H by using D, Da and R as parameters, and
f2(D, Da, R) is a function, which determines a higher limit value of H by using D, Da and R as the parameters.

2. The fluid passage device according to claim 1, wherein the branch passage is formed at an axially intermediate portion of the closed passage.

* * * * *